(12) United States Patent
Cho

(10) Patent No.: US 9,995,329 B2
(45) Date of Patent: Jun. 12, 2018

(54) SELF-PIERCING RIVET

(71) Applicant: SUNGWOO HITECH CO., LTD., Busan (KR)

(72) Inventor: Haeyong Cho, Busan (KR)

(73) Assignee: SUNGWOO HITECH CO., LTD., Bushan (KR)

( * ) Notice: Subject to any disclaimer, the term of this patent is extended or adjusted under 35 U.S.C. 154(b) by 72 days.

(21) Appl. No.: 15/035,271

(22) PCT Filed: Nov. 12, 2014

(86) PCT No.: PCT/KR2014/010860
§ 371 (c)(1),
(2) Date: May 9, 2016

(87) PCT Pub. No.: WO2015/072747
PCT Pub. Date: May 21, 2015

(65) Prior Publication Data
US 2016/0273571 A1    Sep. 22, 2016

(30) Foreign Application Priority Data

Nov. 14, 2013 (KR) .................. 10-2013-0138444

(51) Int. Cl.
| | |
|---|---|
| *F16B 19/06* | (2006.01) |
| *F16B 19/08* | (2006.01) |
| *B21J 15/02* | (2006.01) |
| *F16B 5/04* | (2006.01) |

(52) U.S. Cl.
CPC .......... *F16B 19/086* (2013.01); *B21J 15/025* (2013.01); *F16B 5/04* (2013.01)

(58) Field of Classification Search
CPC .......... F16B 19/086; F16B 5/04; B21J 15/025
USPC ......................................... 411/501
See application file for complete search history.

(56) References Cited

U.S. PATENT DOCUMENTS

| | | | | |
|---|---|---|---|---|
| 913,618 | A | * 2/1909 | Butler | ............... F16G 13/06 |
| | | | | 285/222 |
| 4,488,843 | A | * 12/1984 | Achille | ............ F16B 13/126 |
| | | | | 411/385 |
| 4,781,500 | A | * 11/1988 | Mauer | ............ F16B 19/1054 |
| | | | | 411/36 |

(Continued)

FOREIGN PATENT DOCUMENTS

| | | |
|---|---|---|
| CN | 1411399 | 4/2003 |
| CN | 101678437 | 3/2010 |

(Continued)

OTHER PUBLICATIONS

PCT Search Report, Patent Cooperation Treaty, dated Feb. 10, 2015, PCT/KR2014/010860.

*Primary Examiner* — Gary W Estremsky
(74) *Attorney, Agent, or Firm* — Lex IP Meister, PLLC

(57) ABSTRACT

A self-piercing rivet is disclosed. A self-piercing rivet according to an exemplary embodiment of the present invention may include: a head portion; a shank portion integrally connected with the head portion; a plurality of ribs formed to an external circumferential surface of the shank portion along a length direction of the shank portion in a spiral form and integrally connected to the head portion; and a straight portion integrally formed in a connecting portion in which the head portion and 50 are connected.

5 Claims, 5 Drawing Sheets

(56) References Cited

U.S. PATENT DOCUMENTS

| | | | | |
|---|---|---|---|---|
| 4,990,041 | A * | 2/1991 | Winston | F16B 3/005 |
| | | | | 411/23 |
| 5,575,601 | A * | 11/1996 | Skufca | F16B 17/008 |
| | | | | 29/525.05 |
| 6,660,008 | B1 * | 12/2003 | Foerster | A61B 17/0401 |
| | | | | 411/34 |
| 2004/0096295 | A1 * | 5/2004 | Stevenson | F16B 5/04 |
| | | | | 411/501 |
| 2006/0039778 | A1 | 2/2006 | Palm | |
| 2013/0315690 | A1 * | 11/2013 | Lee | F16B 19/086 |
| | | | | 411/504 |
| 2013/0322986 | A1 * | 12/2013 | Lee | F16B 19/086 |
| | | | | 411/504 |
| 2013/0322987 | A1 * | 12/2013 | Lee | F16B 19/086 |
| | | | | 411/504 |

FOREIGN PATENT DOCUMENTS

| | | |
|---|---|---|
| JP | 2001-132718 | 5/2001 |
| KR | 10-1188180 | 9/2012 |
| KR | 10-2013-0069204 | 6/2013 |

* cited by examiner

SELF-PIERCING RIVET

CROSS-REFERENCE TO RELATED APPLICATION

This application claims priority to and the benefit of Korean Patent Application No. 10-2013-0138444 filed in the Korean Intellectual Property Office on Nov. 14, 2013, the entire contents of which are incorporated herein by reference.

BACKGROUND OF THE INVENTION (a) Field of the Invention

The present invention relates to a self-piercing rivet. More particularly, the present invention relates to a self-piercing rivet that can join two or more objects together.

(b) Description of the Related Art

The automotive industry pays attention to environmental problems, and applying aluminum alloys and plastic materials to a vehicle body so as to reduce weight of the vehicle body and to improve fuel consumption is one of solutions for solving the environmental problems.

For these purposes, joining methods for assembling a vehicle body instead of using conventional spot welding have been researched and developed.

Recently, a self-piercing rivet using a self-piercing rivet system has been increasingly used.

According to a conventional riveting technique, objects such as steel sheets to be joined together are joined by forming a head portion after a riveting hole is bored and a rivet is inserted into the riveting hole. However, the rivet is press-fitted into the joining objects by hydraulic pressure or pneumatic pressure without forming the riveting hole according to the self-piercing rivet technique. At this time, the rivet is plastically deformed and joins the joining objects together.

A self-piercing rivet is used for joining metal sheets according to the self-piercing rivet technique, and the self-piercing rivet includes a head and a partially hollow cylindrical shank.

For example, the shank of the self-piercing rivet penetrates an upper sheet by a punch of a setting tool. At this time, the shank is supported by a die and is deformed outwardly. In addition, since the shank is press-fitted to a lower sheet in a state that the head portion is supported by the upper sheet, the upper sheet and the lower sheet are joined.

Conventionally, the punch is provided to an upper portion of a C-type frame and an anvil is provided to a lower portion thereof.

In a conventional art, two joining objects are disposed between the punch and the anvil and then the rivet is press-fitted by the punch, pierces the upper joining object, is encapsulated at the lower joining object, and is deformed outwardly by a forming cavity of the anvil, and thus the joining objects are integrally connected.

The joining technique using the self-piercing rivet may be applied for assembling aluminum panels of a vehicle body which is not easily performed by spot welding.

Also, the self-piercing rivet system may provide excellent rigidity and resistance characteristics against fatigue, and may not form distortion on a sheet near the rivet so that the self-piercing rivet system may be acceptable from an aesthetic point of view.

However, in a conventional art, a shank of the self-piercing rivet (hereinafter called a "rivet") pierces the upper joining object, is encapsulated at the lower joining object, and is deformed outwardly by the anvil, and thus the rivet may not be easily separated from the joining objects.

That is, in the conventional art, if it is required to separate the joining objects from each other, the rivet needs to be dismantled or the riveting portion needs to be torn, and thus the joining objects are damaged and deformed. Therefore, the joining objects must be replaced without recycling.

Also, in the conventional art, since the punch and the anvil are used for press-fitting the rivet to join the joining objects, an applicable degree of freedom of riveting may be reduced due to interference with other equipment.

Since the shank of the conventional self-piercing rivet is formed as an annular piercing edge, a penetrated portion of the upper sheet is completely cut off by the annular edge when the shank penetrates the upper sheet and is press-fitted to the lower sheet.

Since the penetrated portion of the upper sheet cut off by the shank cannot form a mechanical interlock of the upper and lower sheets and remains as dead metal, joining strength of the upper and lower sheets may be deteriorated.

In addition, since the dead metal cannot join the upper and lower sheets with sufficient strength, the upper sheet relatively rotates with respect to the lower sheet.

Accordingly, various techniques for preventing rotation of the upper sheet are applied according to conventional arts. For example, a plurality of rivets are used for preventing the rotation of the upper sheet.

If the plurality of rivets is used, processes may be complicated, productivity may be deteriorated, and product cost may be increased due to an increase of processes and components.

Since the shank of the rivet is formed as the annular piercing edge, the shank penetrates the upper sheet with an annular shape, and thereby increases a joining load according to conventional arts.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a self-piercing rivet having advantages of easy separation of the rivet by improving a shape of a shank portion.

The present invention has been made in an effort to provide a self-piercing rivet having further advantages in that joining load and press capacity may be reduced but shear strength may be enhanced, and interference with other equipment is reduced by allowing one-side riveting using a punch so as to improve a degree of freedom of riveting.

The present invention has been made in an effort to provide a self-piercing rivet having advantages in that a penetrated portion reinforces joining strength of joining objects by improving a shape of a shank portion so as to not completely cut off the penetrated portion.

The present invention has been made in an effort to provide a self-piercing rivet having advantages of preventing relative rotation of joining objects using the penetrated portion that is not completely cut off even though just one rivet is used.

The present invention has been made in an effort to provide a self-piercing rivet having advantages of preventing damage of a forging mold in a forging process of a rivet, increasing life span of the forging mold, improving mass production of the rivet, and improving joining strength of joining objects.

A self-piercing rivet according to an exemplary embodiment of the present invention may include: a head portion; a shank portion integrally connected with the head portion; a plurality of ribs formed to an external circumferential surface of the shank portion along a length direction of the shank portion in a spiral form and integrally connected to the head portion; and a straight portion integrally formed in a connecting portion in which the head portion and rib are connected.

The shank portion may be a circular cylinder, the ribs may be disposed at the external circumferential surface of the shank portion with an constant distance therebetween, the shank portion may have a connecting end connected to the head portion and a free end being an opposite end of the connecting end, and the ribs may be formed from the connecting end to the free end in a spiral form.

The straight portion may be integrally connected with the connecting portion in which the ribs and the head portion are connected, and a straight region may be extended from an internal surface to a lower surface of the head portion along an axis direction of the shank portion, wherein the internal surface is a surface facing the lower surface of the head portion.

The straight portion has a circumferential surface corresponding to the external circumferential surface of the shank portion.

The straight portion may guide the rivet to be smoothly separated from a forging mold when the rivet is knocked out from the forging mold.

The rib may have a rib surface with a predetermined width and rib side surfaces with a predetermined thickness between an external circumferential surface of the shank portion and the rib surface.

The thickness of the rib may be larger than the width of the rib.

The ribs may pierce an upper plate member and a lower plate member overlapped with each other, may be plastically deformed within the lower plate member, and may be fixed to the lower plate member.

In one or more exemplary embodiments, since the ribs are formed to have a shank portion in a spiral form, the rivet may rotate during press-fitting to join the joining objects and the self-piercing rivet is able to be separated from the riveting target portion of the joining objects by a torque applied to the opposite spiral direction of the ribs.

Thus, in one or more exemplary embodiments, if it is required to separate the joining objects from each other, the rivet may be easily separated without being dismantled or tearing the riveting portion, so the joining objects may be recycled.

In one or more exemplary embodiments, since the spiral ribs are formed to the shank portion, the entire surface area of the rivet may be increased, shear strength with respect to the upper and lower plate members may be enhanced, and a joining load and press capacity of joining objects may be reduced, thus operating stability of the self-piercing rivet system may be enhanced.

In one or more exemplary embodiments, since a die provided with a receiving portion may be used for just supporting the joining objects, a separate anvil of a conventional art is not required, so interference may be minimized and a degree of freedom of riveting may be improved.

In one or more exemplary embodiments, upper and lower plate members provided with holes formed to the riveting target portion may be joined by riveting, and thus the die does not need to be provided with a receiving portion such as hole or a groove, and a lower surface of the lower plate member may be flat.

Therefore, in one or more exemplary embodiments, the flat lower surface of the lower plate member may satisfy needs of the vehicle manufacturing industry which prefers joining objects without protrusions.

In one or more exemplary embodiments, since the penetrated portion is not cut off completely even though just one rivet is used, relative rotation of joining objects may be prevented and joining strength of the joining objects may be enhanced.

In one or more exemplary embodiments, since one or very few rivets may join the joining objects, productivity may be improved and manufacturing cost may be reduced by reducing riveting processes and element numbers.

Further, since a straight portion is formed at a connecting portion of a head portion and a rib, it is possible to prevent damage of a forging mold in a forging process and increase life span of the forging mold, and improve mass production of the rivet.

Further, since the straight portion is integrally formed in a connecting portion of the rib and the head portion, an empty space formed between the upper plate member and the ribs is reduced by the straight portion and the joining strength of the upper plate member and the lower plate member is improved when an upper plate member and a lower plate member are joined.

Further, the self-piercing rivet according to an exemplary embodiment of the present invention can be applied to joining of a high strength plate and an aluminum plate.

BRIEF DESCRIPTION OF THE DRAWINGS

The drawings illustrate exemplary embodiments of the present invention and are not construed to limit any aspect of the invention.

DETAILED DESCRIPTION OF THE EMBODIMENTS

Figure 1:
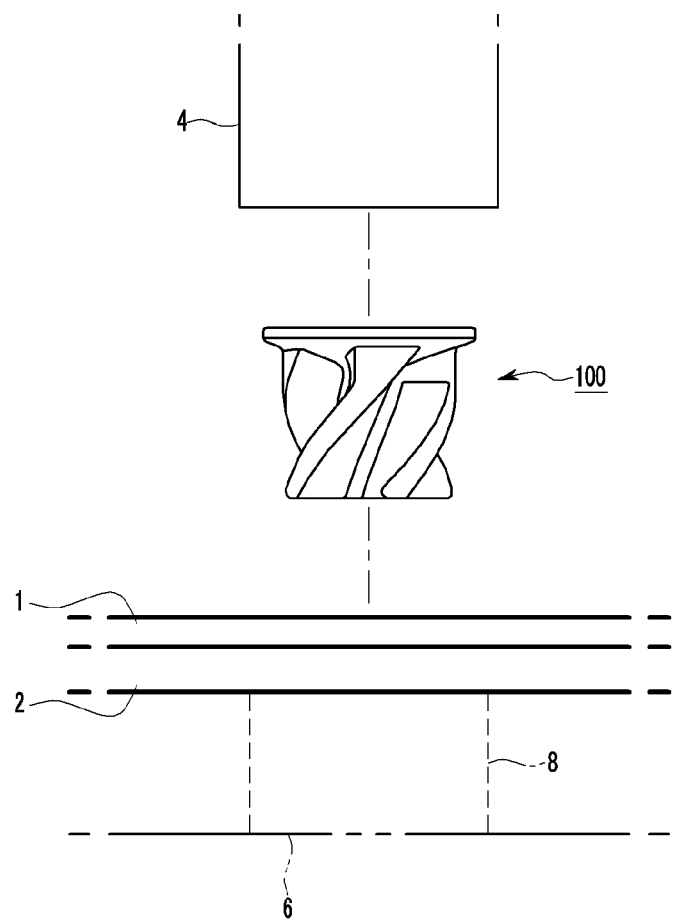
FIG. 1 is a drawing showing a self-piercing rivet according to an exemplary embodiment of the present invention.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In addition, size and thickness of components shown in the drawings may be differ from actual size and actual thickness of the components for better comprehension and ease of description. Therefore, the present invention is not limited to those shown in the drawings.

In the detailed description, ordinal numbers are used for distinguishing constituent elements having the same terms, and have no other specific meanings.

In the specification, unless explicitly described to the contrary, the word "comprise" and variations such as "comprises" or "comprising" will be understood to imply the inclusion of stated elements but not the exclusion of any other elements.

In the specification, terms such as "portion" and "means" mean a unit of a comprehensive element having at least one function or movement.

FIG. 1 is a drawing showing a self-piercing rivet according to an exemplary embodiment of the present invention.

In the specification, joining objects may be defined as basic materials for joining with a rivet, and a joined article may be defined as a processed article of which the joining objects are joined by riveting.

Referring to FIG. 1, a self-piercing rivet 100 (hereinafter called a "rivet") according to an exemplary embodiment of the present invention joins at least two metal sheets.

It is exemplified in this specification that two metal sheets are used, and the two metal sheets are called an upper plate member 1 and a lower plate member 2, respectively.

In the specification, an upper surface or a top surface will be defined as an upward surface in the drawings, and a lower surface or a bottom surface will be defined as a downward surface in the drawings.

One sheet of the first and second sheets 1 and 2 disposed to an upper position of the drawings will be denoted as the upper plate member 1, and the other sheet will be denoted as the lower plate member 2 for better comprehension. Although other plate members may be disposed between the upper plate member 1 and the lower plate member 2, the self-piercing rivet 100 will be described for joining the upper plate member 1 and the lower plate member 2 for better comprehension.

The terms described above are defined for better comprehension, and thus the terms may not limit the spirit or scope of the present invention and other definitions may be situationally used in the specification for better comprehension.

The self-piercing rivet 100 may join joining objects such as the upper and lower plate members 1 and 2 that are overlapped through a self-piercing rivet system.

That is, the self-piercing rivet system press-fits the rivet 100 into the upper plate member 1 and the lower plate member 2 overlapped with each other with a predetermined pressure, and is adapted to join the upper plate member 1 and the lower plate member 2 by plastic deformation of the upper plate member 1, the lower plate member 2, and the rivet 100.

In an exemplary embodiment of the present invention, the upper plate member 1 and the lower plate member 2 are made of a plastic material, a rubber material, an aluminum sheet, or a steel sheet (including a high-tension steel sheet).

The upper plate member 1 and the lower plate member 2 can be made of the same material or different materials.

The self-piercing rivet system of which the self-piercing rivet 100 according to an exemplary embodiment of the present invention is applicable may be provided to a robot, and may include a punch unit 4 for pressing the rivet 100 and a die 6 for supporting the upper and lower plate members 1 and 2 that overlap each other.

The punch unit 4 feeding the rivet 100 includes a punch cylinder driven by hydraulic pressure or pneumatic pressure, and a punch operated by the punch cylinder.

The punch unit 4 may use a striking apparatus for speedy and continuous impacting of the rivet 100.

The punch unit 4 of the self-piercing rivet system is well-known to be applied to an SPR (self-piercing riveting) system, and thus a detailed description thereof will be omitted in this specification.

In an exemplary embodiment of the present invention, the die 6 supporting and absorbing an impact force during the rivet driving operation may be mounted to a conventional C-type frame such as an anvil die, or the die 6 may be a separate plate-type structure for supporting the overlapped upper and lower plate members 1 and 2.

In the die 6, a receiving portion 8 is formed as a hole or a dome for receiving a plastically deformed portion of a predetermined riveting target portion of the upper and lower plate members 1 and 2. In an exemplary embodiment of the present invention, the receiving portion 8 of the die 6 is a hole as shown in the drawings for better comprehension.

The receiving portion 8 receives a plastically deformed portion of the predetermined riveting target portion of the upper and lower plate members 1 and 2.

In an exemplary embodiment of the present invention, the riveting target portion of the upper and lower plate members 1 and 2 may be flat without a hole.

The rivet 100 according to an exemplary embodiment of the present invention applicable to the self-piercing rivet system penetrates the upper plate member 1 by pressing of the punch unit 4, is press-fitted into the lower plate member 2, and plastically deforms the upper and lower plate members 1 and 2 though the receiving hole 8 of the die 6 so as to integrally join the upper plate member 1 and the lower plate member 2.

The self-piercing rivet 100 according to an exemplary embodiment of the present invention prevents damage of a forging mold 9 (refer to FIG. 4) during a forming process of a basic material of the rivet, increases the life span of the forging mold 9, improves mass production of the rivet, and improves joining strength of joining objects.

Hereinafter, the self-piercing rivet 100 according to an exemplary embodiment of the present invention will be described in detail referring to FIG. 1 and accompanying drawings.

Figure 2:
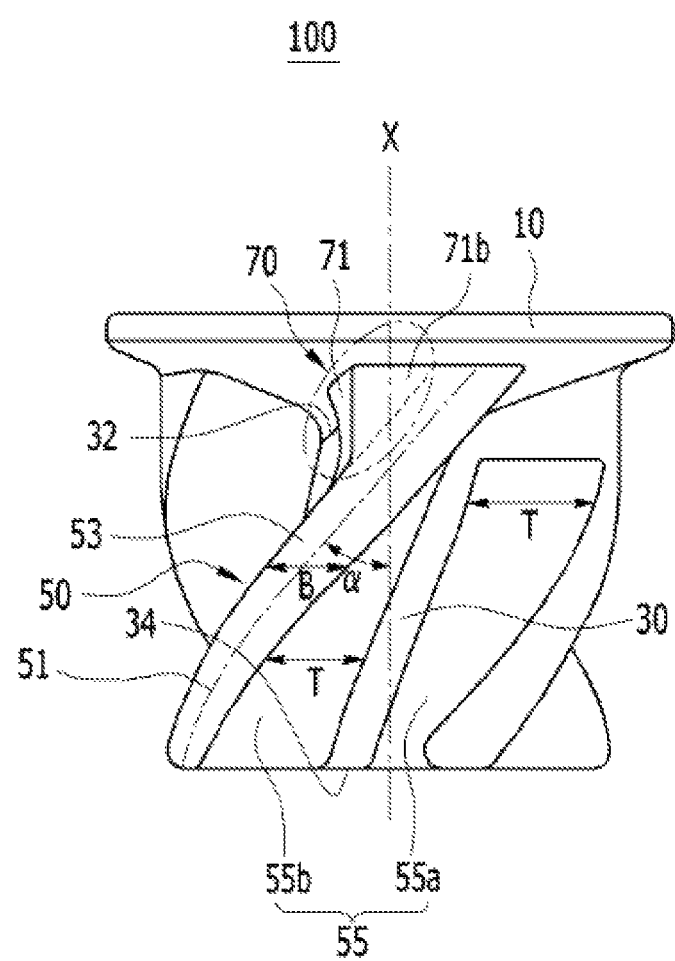
FIG. 2 is a perspective view of a self-piercing rivet according to an exemplary embodiment of the present invention.

FIG. 2 is a perspective view of a self-piercing rivet according to an exemplary embodiment of the present invention.

Referring to FIG. 1 and FIG. 2, the self-piercing rivet 100 according to an exemplary embodiment of the present invention basically includes a head portion 10, a shank portion 30, ribs 50, and a straight portion 70, and each component will be described in detail.

The self-piercing rivet 100 is formed through a forging process through pressing a basic material of the rivet (called a 'billet') to the forging mold 9, and a forming protrusion, a forming groove, and a forming hole are formed corresponding to the head portion 10, the shank portion 30, the ribs 50, and the straight portion 70 in the forging mold 9.

The head portion 10 receives a load of the punch unit 4 and has a disk shape with a predetermined thickness.

The head portion 10 may support the riveting target portion of the upper plate member 1 when the rivet 100 plastically deforms the upper and lower plate members 1 and 2 that overlap each other.

In an exemplary embodiment of the present invention, the shank portion 30 plastically deforms the riveting target portion of the upper and lower plate members 1 and 2 that overlap each other, and is integrally connected with a lower portion of the head portion 10.

The shank portion 30 may be a solid circular cylinder and thus buckling may not occur during pressing of the punch unit 4.

Hereinafter, a connected portion of the shank portion 30 to the head portion 10 will be denoted as a connecting end 32, and an opposite portion of the shank portion 30 will be denoted as a free end 34.

The length of the shank portion 30 may vary according to thickness of the upper and lower plate members 1 and 2 and so on, and thus in an exemplary embodiment of the present invention, the length of the shank portion 30 may not be limited to specific ranges.

In an exemplary embodiment of the present invention, the ribs 50 are adapted to plastically deform the riveting target portion of the upper and lower plate members 1 and 2 with the shank portion 30 by pressing of the punch unit 4, penetrate the upper plate member 1, pierce the upper and lower plate members 1 and 2, and be plastically deformed.

Also, the ribs 50 are adapted to rotate the rivet 100 during plastic deformation of the riveting target portion of the upper and lower plate members 1, penetrating the upper plate member 1, and piercing the upper and lower plate members 1 and 2 by changing pressure of the punch unit 4 to torque.

That is, the ribs 50 induce the rivet 100 to be rotated during penetration of the upper plate member 1 and piercing of the lower plate member 2, and are plastically deformed and encapsulated within the lower plate member 2 so as to join the upper and lower plate members 1 and 2. That is, the upper plate member and the lower plate member 1 and 2 may be joined by a frictional force of the ribs 50 and plastic deformation of the ribs 50.

The ribs 50 according to an exemplary embodiment of the present invention integrally protrude from an external circumferential surface of the shank portion 30, and are disposed in a spiral form along the length direction of the shank portion 30. There are multiple ribs 50, and they are disposed at the external circumferential surface of the shank portion 30 at constant distances.

In detail, the ribs 50 according to an exemplary embodiment of the present invention are integrally connected with the head portion 10, are formed from the connecting end 32 to the free end 34 of the shank portion 30 in a spiral from, and are disposed along a circular arc of the shank portion 30 at constant distances.

The ribs 50 are formed from the connecting end 32 to the free end 34 of the shank portion 30 to form a spiral 51 (in the drawing, it is denoted as a one-point chain line). For example, the ribs 50 rotate along the length direction of the shank portion 30 in a clockwise direction to form the spiral 51.

The ribs 50 may rotate along the length direction of the shank portion 30 in a counterclockwise direction to form the spiral 51.

In an exemplary embodiment of the present invention, a lead angle α of the spiral 51 may be 30-60°. That is, the helix of the ribs 50 and an axial line X of the shank portion 30 form an angle between 10-45°. The lead angle α of the ribs 50 may differently formed according to strength of joining objects.

In this case, the lead angle α means an angle between the spiral 51 along the connecting end 32 and the free end 34 of the shank portion 30, and the axial line X of the shank portion 30, and it is also called the helix angle.

For example, in an exemplary embodiment of the present invention, the ribs 50 form four spirals 51 along the connecting end 32 and the free end 34 of the shank portion 30.

The lead angle and number of spirals of the ribs 50 are set within such range that the ribs 50 may plastically deform the riveting target portion of the upper and lower plate members 1 and 2, penetrate the upper plate member 1, pierce the upper and lower plate members 1 and 2, and be plastically deformed. In one or more exemplary embodiments of the preset invention, the lead angle and the number of spirals of the ribs 50 can be set through various simulation tests.

If the lead angle of the rib 50 is less than 30°, the length of the ribs 50 is not sufficient such that the relative amount of the ribs 50 that penetrate the upper plate member 1 and is encapsulated within the lower plate member 2 is not sufficient. Therefore, joining force (connecting force) of the ribs 50 with respect to the upper and lower plate members 1 and 2 may not be sufficient.

Also, if the lead angle of the rib 50 is less than 30°, the number of ribs 50 formed to the external circumference direction of the shank portion 30 may be increased, and thus the encapsulated portion of the upper and lower plate members 1 and 2 which would be positioned between the ribs 50 may be reduced, so the joining force (connecting force) of the ribs 50 with respect to the upper and lower plate members 1 and 2 may be reduced.

On the contrary, if the lead angle of the ribs 50 is over 60°, manufacturing of the ribs 50 may be difficult. Also, at the instant that the ribs 50 with the shank portion 30 plastically deform the riveting target portion of the upper and lower plate members 1 and 2, ends of the ribs 50 may be plastically deformed without piercing the upper plate member 1 and the joining objects may not be sufficiently joined.

Thus, in one or more exemplary embodiments, the lead angle of the ribs 50 is set within such range that the ribs 50 may plastically deform the riveting target portion of the upper and lower plate members 1 and 2, penetrate the upper plate member 1, pierce the upper and lower plate members 1 and 2, and be plastically deformed. In one or more exemplary embodiments of the preset invention, the lead angle can be set to 30°-60°.

The lead angle and number of spirals of the ribs 50 can be set through various simulation tests.

The spiral length of the ribs 50 may vary according to the length of the shank portion 30, the thickness of the upper and lower plate members 1 and 2, the lead angle, and so on, and thus in an exemplary embodiment of the present invention, the spiral length of the ribs 50 may not be limited to specific ranges.

Each rib 50 has a rib surface 53 with width B and rib side surfaces 55 with thickness T. The rib side surfaces 55 include an internal surface 55a and an external surface 55b based on the rib surface 53 along a moving direction of the rib 50. In the specification, the internal surface 55a is defined as a surface facing a lower surface of the head portion 10, and the external surface is defined as an opposite surface of the internal surface 55b. In FIG. 2, width B of the rib surface is the linear dimension between the internal surface 55a and the external surface 55b and thickness T of the side surfaces 55 is the radial dimension between the external circumferential surface of the shank portion 30 and the rib surface 53.

In one or more exemplary embodiments, the thickness T of the rib 50 is larger than the width B of the rib 50.

The relationship of the thickness T of the rib side surface 55 and the width B of the rib surface 53 may induce the ribs 50 to be encapsulated with a sufficient encapsulated area (surface) within the lower plate member 2.

The straight portion 70 minimizes damage of the forging mold 9 and impact force supplied to the forging mold 9 when the rivet 100 is knocked out from the forging mold 9 after forming the rivet 100 in the forging mold 9.

Further, the straight portion 70 guides the rivet 100 to be smoothly separated from the forging mold 9 when the rivet 100 is knocked out from the forging mold 9 (in other words, when the rivet 100 is separated from the forging mold 9 by a knock-out pin).

Also, since the straight portion 70 reduces empty space between the ribs 50 and the joining objects, joinability of joining objects is improved.

The straight portion 70 may be integrally formed in a connected portion where the head portion 10 and the rib 50 are connected.

In detail, a straight region 71 formed in the straight portion 70 is extended from the internal surface 55a to the lower surface of the head portion 10 along an axis direction of the shank portion 30.

In FIG. 2, the straight portion 70 may be integrally formed in an upper portion of the rib 50, have a same surface as the rib surface 53, and be integrally connected with the connecting end 32 and the lower surface of the head portion 10.

That is, the straight portion 70 has a circumferential surface 71b corresponding to the external circumferential surface of the shank portion 30, and the straight region 71 extended from the internal surface 55a to the lower surface of the head portion 10 in the upper portion of the rib 50.

Hereinafter, an operation of the self-piercing rivet 100 according to an exemplary embodiment of the present invention will be described in detail with reference to accompanying drawings.

Figure 3A:
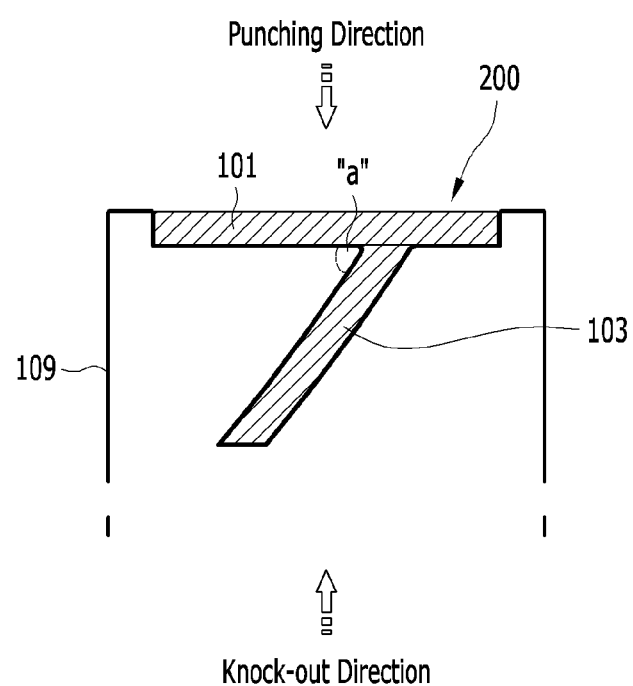
FIG. 3 and FIG. 4 are drawings for explaining an operation of a self-piercing rivet according to an exemplary embodiment of the present invention.
Figure 3B:
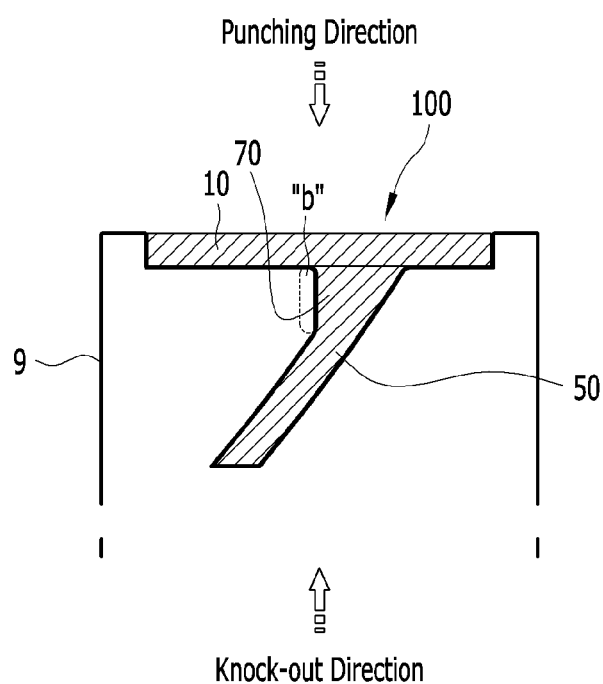
Figure 4:
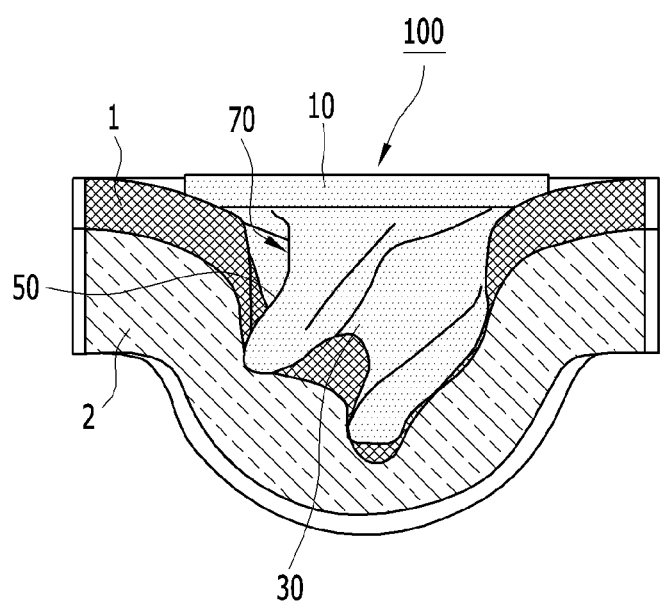

FIG. 3 and FIG. 4 are drawings for explaining an operation of a self-piercing rivet according to an exemplary embodiment of the present invention.

First, an operation of a comparative example drawn in FIG. 3A will be described.

The self-piercing rive 100 according to an exemplary embodiment of the present invention has the straight portion 70, but a self-piercing rivet 200 according to the comparative example does not have the straight portion.

The self-piercing rivet 200 according to the comparative example may be formed by punching a basic material of the rivet to a forging mold 109 having a forming protrusion, a forming groove, and a forming hole corresponding to a head portion 101, a shank portion (not shown), and a rib 103.

When the self-piercing rivet 200 according to the comparative example is formed by punching the basic material of the rivet to the forging mold 109, since tension stress is applied to a rib forming portion (refer to 'a' of FIG. 3A) which is formed to be sharp, the rib forming portion may be broken.

Generally, since the forging mold 109 is made of a material having high hardness and brittleness, the forging mold 109 is robust to a compression force but is vulnerable to tension stress. Therefore, tension stress is applied to the rib forming portion of the forging mold 109 when the basic material of the rivet is punched, thus the rib forming portion may be easily broken.

Meanwhile, when the self-piercing rivet 200 according to the comparative example is knocked out from the forging mold 109 after forming the self-piercing rivet 200, the rib 103 presses the rib forming portion by the knocking out.

Therefore, tension stress is applied to the rib forming portion by the rib 103, thus the rib forming portion may be easily broken.

Accordingly, damage occurs in the forging mold 109 during the forming process of the self-piercing rivet 200, such that the life span of the forging mold 109 is reduced and mass production of the rivet is deteriorated.

However, referring to FIG. 3B, the self-piercing rivet 100 according to an exemplary embodiment of the present invention has the straight portion 70 formed in the connecting portion where the head portion 10 and the rib 50 are connected.

The self-piercing rivet 100 according to an exemplary embodiment of the present invention may be formed by punching the basic material of the rivet to the forging mold 9 having the forming protrusion, the forming groove, and the forming hole corresponding to the head portion 10, the shank portion (not shown), the ribs 50, and the straight portion 70.

Here, a straight region corresponding to the straight portion 70 of the rivet 10 is formed in a rib forming portion (refer to 'b' of FIG. 3B) of the forging mold 9.

When the basic material of the rivet is punched to the forging mold 9 during the forming process, since tension stress is not applied to the rib forming portion of the forging mold 9, the rib forming portion is not broken.

Also, since tension stress is not applied to the rib forming portion when the rivet 200 is knocked out from the forging mold 9, the rib forming portion is not broken.

Therefore, it is possible to prevent damage of the forging mold 9 during the forming process of the rivet 100, the life span of the forging mold 9 is increased, and mass production of the rivet is improved.

Hereinafter, a joining process of the joining objects using the self-piercing rivet 100 according to an exemplary embodiment of the present invention will be described in detail.

Referring to FIG. 1, FIG. 2, and FIG. 4, the upper and lower plate members 1 and 2 overlapping each other are set on the plate-type die 6.

In one or more exemplary embodiments, the die 6 may not be an anvil provided to a conventional C-type frame. The die 6 may be a separated plate-type structure for supporting the overlapped upper and lower plate members 1 and 2.

The riveting target portion of the upper and lower plate members 1 and 2 may not have holes and may be disposed on the receiving portion 8 of the die 6.

At that state, the punch unit 4 of the self-piercing rivet system is moved toward the riveting target portion of the upper and lower plate members 1 and 2 and the rivet 100 is fed to the punch unit 4.

Then, the cylinder of the punch unit 4 driven by hydraulic pressure or pneumatic pressure is operated for the punch to press the head portion 10 of the rivet 100.

Then the ribs 50 together with the shank portion 30 plastically deform the riveting target portion of the upper and lower plate members 1 and 2.

When the riveting target portion of the upper and lower plate members 1 and 2 is plastically deformed, the deformed portion of the riveting target portion may be protruded from the lower surface of the lower plate member 2 and received in the receiving portion 8 of the die 6.

At this moment, the ends of the ribs 50 pierce the upper plate member 1 by pressing of the punch unit 4 and it is plastically deformed within the lower plate member 2.

In one or more exemplary embodiments, the ribs 50 forming the spirals 51 from the connecting end 32 to the free end 34 induce the rivet 100 to be rotated from the moment of penetrating the upper plate member 1, pierce the lower plate member 2, and by plastically deformed and encapsulated within the lower plate member 2 so as to join the upper and lower plate members 1 and 2 due to the torque.

That is, the ribs 50 may change the pressing force received from the punch unit 4 to the torque.

In one or more exemplary embodiments, the ribs 50 plastically deform the riveting target portion of the upper and lower plate members 1 and 2 with the shank portion 30, the ends of which rotate and penetrate the upper plate member 1, pierce the upper and lower plate members 1 and 2, and are plastically deformed so as to integrally join the upper and lower plate members 1 and 2.

The ends of the ribs 50 are encapsulated within the lower plate member 2 being plastically deformed so as to form a mechanical interlock of the upper and lower plate members 1 and 2.

In one or more exemplary embodiments, since the rotating rivet 100 penetrates the upper plate member 1 and pierces the lower plate member 2, the deformed portion of the upper plate member 1 corresponding to a space between the ribs 50 may be connected with each other.

That is, although the ends of the ribs 50 penetrate the upper plate member 1, the riveting target portion of the upper plate member 1 is not completely separated, so the riveting target portions of the upper plate member 1 except for the penetrated portion may be connected to each other.

Since dead metal that is completely cut off may not remain, the deformed portion of the riveting target portion of the upper plate member 1 is used for reinforcing joining strength of the upper plate member 1 and the lower plate member 2.

The deformed portion of the upper plate member 1 is used for generating mechanical interlock of the upper plate member 1 and the lower plate member 1 and 2, and attaching the upper plate member 1 and the lower plate member 2 with a predetermined strength.

Accordingly, even though only one rivet is used, the rotation of the upper plate member 1 and the lower plate member 2 is prevented and joining strength of the upper plate member 1 and the lower plate member 2 is further improved.

In addition, since joining objects are joined by using one rivet, productivity may be improved and manufacturing cost may be reduced by reducing the number of joining processes and components.

Since the ribs 50 are formed to the shank portion 30, the contact area of the entire rivet 100 may be increased, so shear strength of the rivet 100 with respect to the upper and lower plate members 1 and 2 may be enhanced, joining load and press capacity may be reduced, and accordingly operating stability of the self-piercing rivet system may be enhanced.

In one or more exemplary embodiments, since the plate-type die 6 provided with the receiving portion 8 may be applied for just supporting the upper and lower plate members 1 and 2, an anvil in a conventional art for the rivet to be deformed outwardly may not be required. Accordingly, interference with other equipment may be minimized and design freedom of the riveting process may be improved.

Furthermore, the straight portion 70 is integrally formed in a connecting portion of the rib 50 and the head portion 10, an empty space formed between the upper plate member 1 and the ribs 50 is reduced by the straight portion 70, and the joining strength of the upper plate member 1 and the lower plate member 2 is improved when a upper plate member 1 and a lower plate member 2 are joined.

That is, since the empty space formed between the upper plate member 1 and the ribs 50 is filled by the straight portion 70, joining force is improved by frictional force of the straight portion 70 and the upper plate member 1.

Meanwhile, since the rivet 100 is rotated along the spiral direction due to the ribs 50 so as to integrally join the upper and lower plate members 1 and 2, if opposite direction torque of the joining force of the ribs 50 with respect to the joining objects is applied, the rivet 100 may be easily separated from the joining objects.

Thus, in one or more exemplary embodiments, if it is required to separate the joining objects from each other, the rivet may be easily separated without being dismantled or tearing the riveting portion, so the joining objects may be recycled.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A self-piercing rivet comprising:
a head portion;
a shank portion integrally connected with the head portion;
a plurality of ribs formed to an external circumferential surface of the shank portion along a length direction of the shank portion in a spiral form and integrally connected to the head portion; and
a straight portion integrally formed in a connecting portion in which the head portion and rib are connected,
wherein the shank portion is a circular cylinder,
the ribs are disposed at the external circumferential surface of the shank portion with an even distance therebetween, the shank portion has a connecting end connected to the head portion and a free end being an opposite end of the connecting end, and the ribs are formed from the connecting end to the free end in a spiral form,
the straight portion is integrally connected with the connecting portion in which the ribs and the head portion are connected,
a straight region is extended from an internal surface to a lower surface of the head portion along an axis direction of the shank portion, and
the internal surface is a surface facing the lower surface of the head portion.

2. The self-piercing rivet of claim 1, wherein
the straight portion has a circumferential surface corresponding to the external circumferential surface of the shank portion.

3. The self-piercing rivet of claim 1, wherein
the straight portion guides the rivet to be smoothly separated from a forging mold when the rivet is knocked out from the forging mold.

4. The self-piercing rivet of claim 1, wherein
the rib has a rib surface with a predetermined width and rib side surfaces with a predetermined thickness between an external circumferential surface of the shank portion and the rib surface.

5. The self-piercing rivet of claim 4, wherein
the thickness of the rib side surfaces is larger than the width of the rib surface.

* * * * *